United States Patent [19]

Oetiker

[11] Patent Number: 5,487,209
[45] Date of Patent: Jan. 30, 1996

[54] SELF-TIGHTENING CLAMP STRUCTURE

[75] Inventor: Hans Oetiker, Horgen, Switzerland

[73] Assignee: Hans Oetiker AG Maschinen- und Apparatefabrik, Horgen, Switzerland

[21] Appl. No.: 163,546

[22] Filed: Dec. 9, 1993

[51] Int. Cl.⁶ ........................... F16L 33/02
[52] U.S. Cl. ............ 24/20 R; 24/20 S; 24/20 TT; 24/456
[58] Field of Search ............... 24/20 R, 20 TT, 24/20 S, 20 EE, 456, 20 CW, 20 W

[56] References Cited

U.S. PATENT DOCUMENTS

| | | | |
|---|---|---|---|
| 2,180,271 | 11/1939 | Arras | 24/456 X |
| 4,425,681 | 1/1984 | Ilins | 24/20 S |
| 4,858,279 | 8/1989 | Kato et al. | 24/20 R |
| 4,930,191 | 6/1990 | Takahashi et al. | 24/20 R |
| 5,203,809 | 4/1993 | Oetiker | 24/20 WX |

*Primary Examiner*—James R. Brittain
*Attorney, Agent, or Firm*—Paul M. Craig, Jr.

[57] ABSTRACT

A so-called stepless self-tightening clamp structure having a first clamping position and a second non-clamping position in which the clamping band is under prestress of its inherent spring characteristics. To latchingly hold the clamp structure in its second position, one end of the clamping band is provided with a tongue-like extension while the other end is provided with two longitudinally extending, slot-like openings following one another by way of a constriction, whereby one of the slot-like openings is wider than the tongue-like extension and the other is slightly narrower than the tongue-like extension. One of said slot-like openings is thereby offset in the radial direction with respect to at least a part of the other slot-like opening. Additionally, to enhance the spring stiffness, the clamping band may be provided with one or more longitudinally extending reinforcing groove.

30 Claims, 1 Drawing Sheet

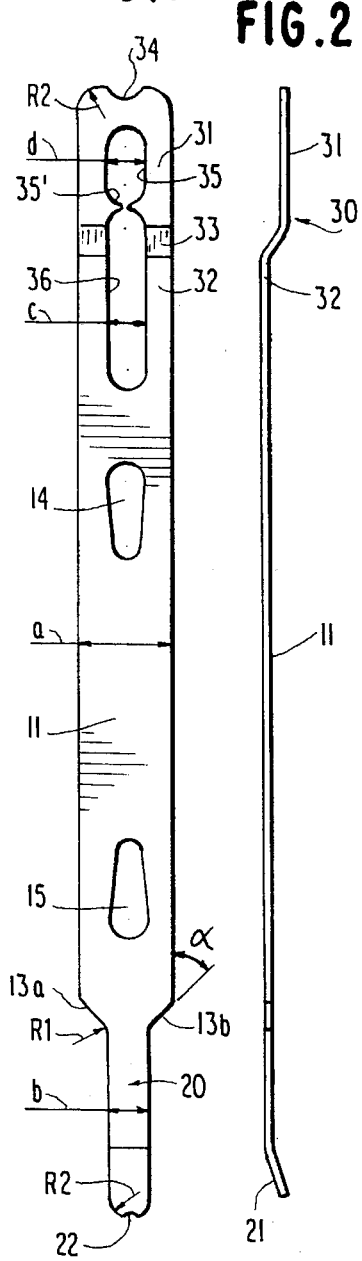
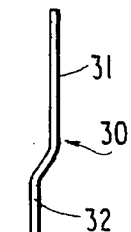
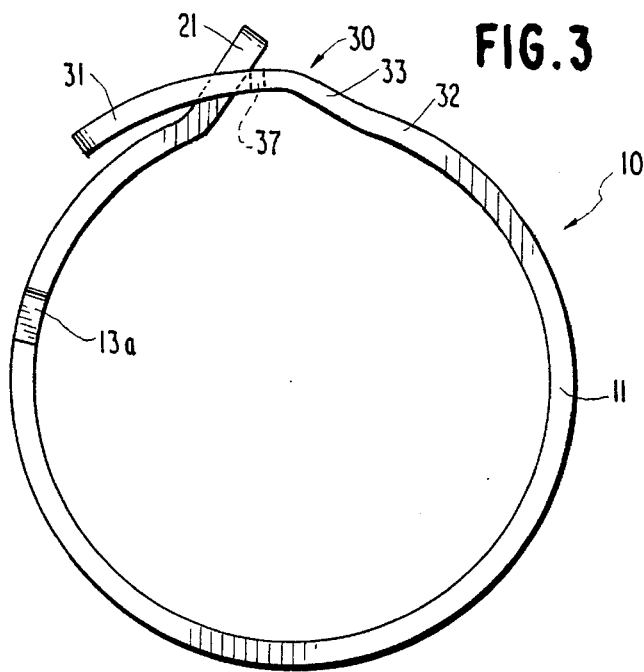
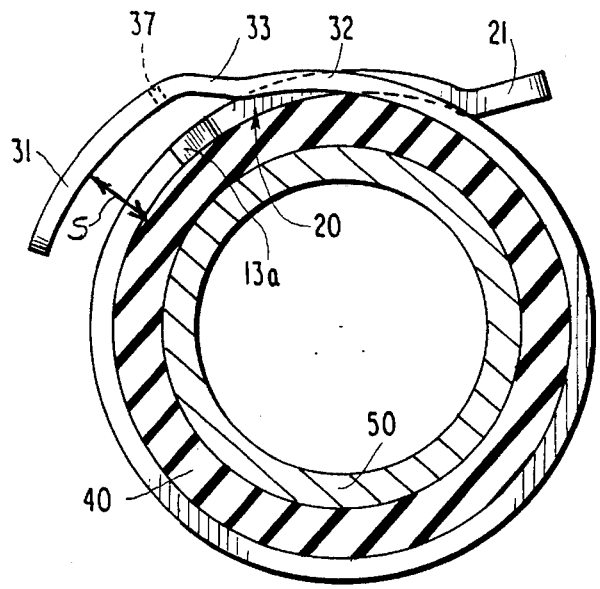
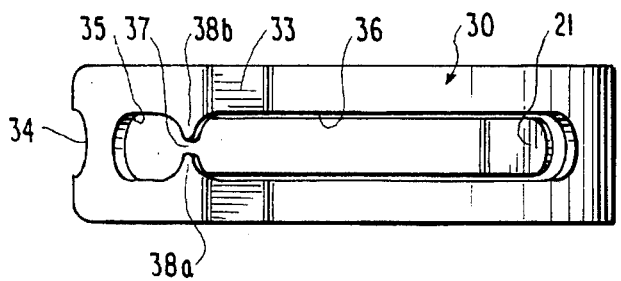

SELF-TIGHTENING CLAMP STRUCTURE

The present invention relates to a self-tightening clamp structure, and more particularly to a self-tightening reusable clamp structure which provides internal clamping surfaces devoid of steps, offsets or interruptions to assure a completely satisfactory fluid-tight connection.

BACKGROUND OF THE INVENTION

Self-tightening clamps, i.e., clamps made from spring wire or spring steel band material, which are also referred to in the art as constant-tension clamps, are known as such. In their simplest form, such clamps, which, by their inherent spring characteristics, normally tend to assume their closed clamping position, consist of spring wire with overlapping, outwardly extending ends, whereby the clamps are opened by forcing the overlapping outwardly extending ends toward one another. Once installed over a hose, the outwardly extending ends are released and the clamp will assume its clamping position. Self-tightening clamps made from band material are also known in the prior art. They usually consist of a tongue-like extension at one end and are preferably provided with a latching device at the other end to latch the clamp in its prestressed condition. The thus-opened latched clamps are shipped to the user who will install the open clamps and then release the latching engagement. The U.S. Pat. Nos. 4,305,791; 4,425,681; 4,773,129; 4,858,279; 4,930,191; 4,930,192 and 4,996,749 are representative of prior art self-tightening clamps made from band material. All of these prior art clamps, however, involve an injury danger in use owing to outwardly extending parts thereof, not to mention lack of clamping surfaces devoid of discontinuities, steps or offsets.

The clamps described in my prior U.S. Pat. No. 5,203,809 represented a significant step in the direction toward greater safety coupled with reliable clamping action over the entire circumference. In particular, the clamp illustrated in FIGS. 24 through 30 has proved commercially successful. However, apart from being relatively complicated and costly to manufacture, its snap-like release from the latched position into the clamping position occasionally produces some sparking which is unacceptable within the area, for example, of gasoline lines and the like. Sparking danger can be reduced with the use of a lacquer cover layer on the surface of the clamp. However, such lacquer layer again increases the cost of the clamp.

SUMMARY OF THE INVENTION

Accordingly, it is an object of the present invention to provide a self-tightening clamp of the type described above which eliminates by simple means the aforementioned shortcomings and drawbacks encountered in the prior art.

Another object of the present invention resides in a self-tightening clamp which is so constructed and arranged that it can be released from its latched condition most conveniently with a positive guidance by the use of a tool, thereby preventing the snap-like return to the clamping action which might cause sparking.

A further object of the present invention resides in a self-tightening clamp of the type described above which is extraordinarily simple in construction and low cost in manufacture.

Still another object of the present invention resides in a self-tightening clamp which can be easily opened and closed under positive guidance with the use of the same tool.

The underlying problems are solved in accordance with the present invention by a self-tightening clamp structure having a first clamping position and a second non-clamping position in which the clamping band is under prestress of its inherent spring characteristics. To latchingly hold the clamp structure in its second position, one end of the clamping band is provided with a tongue-like extension while the other end is provided with two longitudinally extending, slot-like openings following one another in the longitudinal direction of the clamping band by way of a constriction, whereby one of the slot-like openings is wider than the tongue-like extension and the other is narrower than the tongue-like extension. One of the slot-like openings is thereby offset in the radial direction with respect to at least a part of the other slot-like opening. Additionally, to enhance the spring characteristics, the clamping band may be provided with a longitudinally extending reinforcing groove.

BRIEF DESCRIPTION OF THE DRAWINGS

These and other objects, features and advantages of the present invention will become more apparent from the following description which shows, for purposes of illustration only, one embodiment in accordance with the present invention and wherein:

FIG. 1 is a top plan view on a self-tightening clamp structure in accordance with the present invention;

FIG. 2 is a side elevational view of the clamp structure of FIG. 1;

FIG. 3 is an axial elevational view of the clamp structures of FIGS. 1 and 2 in the latched, open condition thereof;

FIG. 4 is an axial elevational view, similar to FIG. 3, but showing the clamp structure in the closed clamping condition in which it clamps a tubular member onto a fixed part; and FIGS. 5 is a top plan view on the clamp structure shown in FIG. 4.

DETAILED DESCRIPTION OF THE DRAWINGS

Referring now to the drawing wherein like reference numerals are used throughout the various views to designate like parts, the clamp structure generally designated by reference numeral 10 consists of a clamping band 11 which is provided at one end thereof with a tongue-like extension generally designated by reference numeral 20. The bent-up end portion 21 of the tongue-like extension 20 is provided in its rounded-off end with a tool-engaging notch 22. The full band width of the clamping band 11 passes over into the tongue-like extension by way of tapering portions 13a and 13b subtending an angle α with respect to the longitudinal direction of the clamping band 11 and rounded-off with a radius of curvature $R_1$ where these tapering portions 13a and 13b pass over into the tongue-like extension The opposite end portion of the clamp structure generally designated by reference numeral 30 includes a first section 31 connected with a second section 32 by way of a step-like connecting section 33. The end portion 30 is provided at its rounded-off free end with a tool-engaging notch 34 and, proceeding from that end of the clamping band in the direction toward the tongue-like extension 20, is provided with a first elongated opening 35 and a second elongated opening 36 in communication with the first elongated opening 35 by way of a narrow constriction 37 formed by inwardly extending projections 38a and 38b (FIG. 5). The tongue-like extension 20 tapers in the end portion 21 in the direction toward its free end, whereby such taper may be formed by a part of a circular arc of radius R2 on both sides thereof. The clamping band is further provided intermediate the slot-like opening 36 and the tongue-like extension 20 with two openings 14 and 15 which, in the illustrated embodiment, taper toward one another in width. These openings 14 and 15 are provided for ease of handling of the clamp structure. Their number and shapes may be varied depending on the requirements of the clamp structure.

The width c, i.e., the dimension in the transverse direction of the clamping ban, of the slot-like opening 36 is thereby greater than the width dimension d of the slot-like opening 35 and is also larger than the width b of the tongue-like extension so that the tongue-like extension can slide freely within slot 36 during opening and subsequent release into the clamping position of the clamp structure. On the other hand, the width d of the slot-like opening 35 is preferably somewhat smaller than the width b of the tongue-like extension 20 so that only a part of the tapered end portion 21 can extend through the same. This will facilitate release of the clamp from its latched, open position as will be explained more fully hereinafter.

FIG. 3 shows the clamp in its open latched position into which it has been forcibly displaced against the inherent springiness of the clamping band material by engagement of a tool as shown, for example, in FIGS. 31 to 33 of my prior U.S. Pat. No. 5,203,809, in tool-engaging notches 22 and 34. The clamp structure 10 as shown in FIG. 3, is held in the open latched position by engagement of the tapering end portion 21 of the tongue-like extension 20 against the rounded end wall 35' of the slot-like opening 35. To release the clamp structure from its latched, open position in FIG. 3, into the unlatched clamping position shown in FIGS. 4 and 5, the same tool is again engaged in notches 22 and 34, whereby the free end 21 continues to be positively guided into the clamping position after being released from the latching position by lowering the protruding end portion 21 to pass underneath the constriction 37. By limiting the extent of projection of the end portion 21 through slot-like opening 35 which is controlled by the width dimensions d and b and by the tapering end portion 21, release is facilitated by the fact that only the tip of the free end of the tongue-like extension which has to pass underneath the constriction 37, extends through the slot-like opening 35. FIG. 4 shows the installed clamp structure 10 in which it clampingly holds a tubular member 40 such as a hose or axle boot on a fixed member 50 such as a nipple or rotating member of a CV joint.

In a typical example which, however, is non-limitative of the present invention, the dimensions for a clamp structure intended to have an internal diameter in its clamping position of 26.5 mm. are as follows:

The length of the clamp structure is about 119.7 mm. while the width of the clamping band is 10 mm. and its thickness is 1.2 mm. The opening 35 has a width d of about 3 mm. and a length of about 8 mm. The distance from the rounded-off end of opening 35 to the corresponding end of the clamp structure is about 4 mm. The slot-like opening 36 has a length of about 20 mm. and a width c of about 4.5 mm. The opening 14 is spaced with its larger rounded-off end at about 38 mm. from the corresponding end of the clamping band and has a length of about 12 mm. The end of the opening 14 with the smaller rounded-off portion is spaced from the end of the opening 15 with smaller rounded-off portion at about 29.2 mm. while the opening 15 also has a length of about 12 mm. and is spaced with its larger rounded-off end from the free end of the tongue-like portion 20 by about 28.5 mm. The tongue-like portion has a width b of about 4 mm. and a length of about 23.3 mm. including the tapering surfaces 13a and 13b which subtend an angle α of about 45° with respect to the longitudinal direction of the clamping band. The tapering side surfaces of the end portion 21 are formed by a portion of a circular arc having a radius of curvature of about 2 mm. or greater while the tool-engaging notch 22 is formed by a radius of curvature of about 1 mm. to a depth of about 0.35 mm. The inclined sides of the openings 14 and 15 thereby intersect at a point halfway between these two openings. The end portion 21 of the tongue-like extension is bent up at an angle of about 40° while the step-like portion 33 is bent-up at an angle of about 30° by way of rounded-off transitions having a radius of curvature of about 0.5 mm. In the installed condition, the first outer end section 31 is spaced in the radial direction from the inner overlapped clamping band by a distance s of about 1.2 mm. (FIG. 4). The length of the bent-up portion 21 is about 5 mm. A radius $R_1$ of about 1 mm. is used for the radius of curvature of the tool-engaging notch 22 as also for the transition of the tapering surfaces 13a and 13b into the tongue-like extension while a radius of about 2 mm. is used for the radius R2 of the tapering side portions of the tongue-like extension as also for the rounded-off ends of the end portion 30 and the tool-engaging notch 34. The larger rounded-off ends of openings 14 and 15 are realized with a radius of curvature of about 2.5 mm. while the curvature of the smaller ends of the openings 14 and 15 are realized with a radius of curvature of 1.5 mm. It is understood, however, that the dimensions given above are merely for illustrative purposes, but may be varied according to size and use of the clamp structure. Important to the present invention which seeks to obtain a clamp structure devoid of any offset, step or discontinuity along its internal clamping surfaces are the construction of the slot-like openings 35 and 36 as latching means in conjunction with the tongue-like extension 20 as also the use of the step-like portion 33 while the width of the constriction 37 would permit the passage of one jaw of the tool.

The clamp structure of this invention is made of very hard material, both from stainless steel as also carbon steel which, if necessary, is hardened and galvanized or externally covered by a lacquer layer to protect against corrosion. A clamp made from stainless steel offers the advantage that the clamps leave the machine in completely finished condition without the need for after-treatment.

The clamping band may also be provided with a reinforcing groove extending in the longitudinal direction substantially within the center to provide a stronger spring stiffness. The reinforcing groove may thereby be interrupted in the area of the openings 35, 36, 14; 15 or may also be provided on both sides of one or more (all) of these openings with a slight overlap with the central reinforcing groove.

Though the preferred manner of releasing the clamp structure of this invention from its open latched position is by means of a tool, such as shown in FIGS. 31–33 of my prior U.S. Pat. No. 5,203,809, it would also be feasible to release the clamp by the application of a downwardly directed force on the end portion 21 of the tongue-like extension 20 by the use of an appropriate tool.

Furthermore, the basic concept of this invention is also applicable to a clamp structure for fastening a hose or the like which has to be secured from the inside in the radially outward direction, i.e., in which the open latched position has a smaller diameter and the normal clamping position, a larger diameter. It is only necessary in that case to reverse the clamp system so that the clamping surfaces devoid of steps, offsets or discontinuities are now located on the outside, and the position of the openings 35 and 36 is reversed.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A self-tightening clamp structure having a first released position in which the clamp structure exerts a clamping action and a second position in which the clamp structure is adapted to be latchingly held against the inherent tightening forces, comprising clamping band means including a tongue-like extension at one end thereof having a bent-up end portion, a first slot-like opening in said clamping band means through which said tongue-like extension is adapted to slide, latching means in the other end area of said clamping band means for holding said clamp structure in the second position, and further means in the end areas of the clamping band means to enable release of said tongue-like extension from said second position into said first clamping position with positive tool guidance of the tongue-like extension in the circumferential direction to prevent sparking during release of the clamp structure from said second position, said further means including tool-engaging surface means extending in a plane transverse to the plane of the clamping band means.

2. A self-tightening clamp structure according to claim 1, wherein said further means includes a second slot-like opening in the other end area of said clamping band means which is separated from said first slot-like opening.

3. A self-tightening clamp structure according to claim 1, further comprising notch-like, tool-engaging means in opposite edge end surfaces of the clamping band means.

4. A self-tightening clamp structure having a first released position in which the clamp structure exerts a clamping action and a second position in which the clamp structure is adapted to be latchingly held against the inherent spring forces, comprising clamping band means, a tongue-like extension at one end of said clamping band means, first and second longitudinally extending slot-like openings near the other end of the clamping band means disposed one behind the other in the longitudinal direction of the clamping band means, said two slot-like openings being of different width in the transverse direction of the clamping band means, and a radially directed offset in the clamping band means near the other end thereof in such a manner that at least one of the slot-like openings is radially outwardly displaced with respect to the inner overlapped clamping band means so that the clamp structure provides an uninterrupted clamping action over its entire circumference.

5. A clamp structure according to claim 4, wherein the offset portion also includes a part of the other slot-like opening.

6. A clamp structure according to claim 4, wherein said first and second longitudinally extending slot-like portions are in communication with one another by way of a constriction of such dimension as to preclude the tongue-like extension to pass from the first slot-like opening into the second slot-like opening to thereby provide a latching action for the clamp structure in its second position.

7. A clamp structure according to claim 6, wherein said first slot-like opening has a width slightly smaller than the width of the tongue-like extension, said tongue-like extension having a tapering portion at the free end thereof whose width varies from the normal width of the tongue-like extension to a width smaller than the width of the first slot-like opening.

8. A clamp structure according to claim 4, wherein the width of the first slot-like opening is smaller than that of the second slot-like opening and wherein the width of the second slot-like opening is greater than the width of the tongue-like extension.

9. A reusable self-tightening clamp structure having a first released position in which the clamp structure exerts a clamping action and a second open position in which the clamp structure is adapted to be latchingly held against the inherent spring forces, comprising clamping band means, a tongue-like extension at one end of said clamping band means, latching means including first and second longitudinally extending slot-like openings near the other end of the clamping band means disposed one behind the other in the longitudinal direction of the clamping band means, said two slot-like openings being of different width in the transverse direction of the clamping band means, means between said two slot-like openings to hold the clamp structure in its second position against inadvertent release to thereby effectively provide a latching action, and a radially outwardly directed offset in the clamping band means near the other end thereof in such a manner that at least the first slot-like opening disposed nearer the other end of the clamping band means is radially outwardly displaced with respect to the inner overlapped clamping band means so that the clamp structure provides an uninterrupted clamping action over its entire circumference.

10. A clamp structure according to claim 9, wherein said latching means is operable to enable release of said clamp structure from said second position into said first position by positive tool guidance.

11. A self-tightening clamp structure having a first released position in which the clamp structure exerts a clamping action and a second position in which the clamp structure is adapted to be latchingly held against the inherent tightening forces, comprising clamping band means including a tongue-like extension at one end thereof having a bent-up end portion, a first slot-like opening in said Clamping band means through which said tongue-like extension is adapted to slide, latching means in the other end area of said clamping band means including further means for releasing said tongue-like extension from said second position into said first clamping position by positive tool guidance to prevent sparking during release of the clamp structure from said second position, said further means including a second slot-like opening in the other end area of said clamping band means which is separated from said first slot-like opening, and said second slot-like opening having a smaller dimension in the transverse band direction than the first slot-like opening.

12. A self-tightening clamp structure according to claim 11, wherein said second slot-like opening is separated from said first slot-like opening by constriction means.

13. A self-tightening clamp structure according to claim 12, wherein said constriction means has a minimum width in the band transverse direction which is smaller than the width of the tongue-like extension and its bent-up end portion.

14. A self-tightening clamp structure according to claim 13, wherein said tongue-like extension has a tapered end portion tapering in the direction toward the free end thereof.

15. A self-tightening clamp structure according to claim 14, wherein the width of said second slot-like opening is smaller than the width of the tongue-like extension by such an amount that the tongue-like extension can extend into the second slot-like opening only with its tapered end portion.

16. A self-tightening clamp structure according to claim 15, wherein the tapered end portion of the tongue-like extension has a curvilinear configuration.

17. A self-tightening clamp structure according to claim 16, wherein said curvilinear configuration is a part of a circle with a first predetermined radius.

18. A self-tightening clamp structure according to claim 13, further comprising notch-like, tool-engaging means in opposite end surfaces of the clamping band means.

19. A self-tightening clamp according to claim 13, wherein said second slot-like opening has a width smaller than the width of said tongue-like extension.

20. A self-tightening clamp according to claim 11, wherein said second slot-like opening has a width smaller than the width of said tongue-like extension.

21. A self-tightening clamp structure having a first released position in which the clamp structure exerts a clamping action and a second position in which the clamp structure is adapted to be latchingly held against the inherent tightening forces, comprising clamping band means including a tongue-like extension at one end thereof having a bent-up end portion, a first slot-like opening in said clamping band means through which said tongue-like extension is adapted to slide, a second slot-like opening following said first slot-like opening in the direction toward the other band end, latching means in the other end area of said clamping band means for holding the clamp structure in its second position, and further means to enable release of said tongue-like extension from said second position into said first clamping position with positive tool guidance of the tongue-like extension in the circumferential direction to prevent sparking during release of the clamp structure from said second position, said further means forming tool-engaging means in the end areas of said clamping band means with tool-engaging surface means in a plane transverse to the plane of the surface of the clamping band means.

22. A self-tightening clamp structure according to claim 21, wherein said latching means includes constriction means between said second slot-like opening and said first slot-like opening.

23. A self-tightening clamp structure according to claim 22, wherein said constriction means are coplanar with the respective area of the clamping band means.

24. A self-tightening clamp structure according to claim 21, wherein the other clamping band end portion provided with said second slot-like opening is radially offset with respect to the inner overlapped clamping band portion but continues to extend, at least, approximately in the circumferential direction.

25. A self-tightening clamp structure having a first released position in which the clamp structure exerts a clamping action and a second position in which the clamp structure is adapted to be latchingly held against the inherent tightening forces, comprising clamping band means including a tongue-like extension at one end thereof having a bent-up end portion, the other end portion of said clamping band means being provided with a first slot-like opening in said clamping band means through which said tongue-like extension is adapted to slide and with a second slot-like opening following said first slot-like opening in the direction toward said other end, and latching means in the other end area of said clamping band means including constriction means between said first and second slot-like openings, and said other end portion of the clamping band means being radially outwardly offset with respect to the inner overlapped clamping band means but continuing generally parallelly to the overlapped inner band portion to reduce injury danger.

26. A clamp structure according to claim 25, wherein the end portion of said tongue-like extension is bent up at an acute angle.

27. A clamp structure according to claim 26, wherein said acute angle is about 40°.

28. A self-tightening clamp structure according to claim 25, wherein said further means is operable to enable opening and closing of the clamp structure under positive guidance with the same tool.

29. A clamp structure according to claim 25, wherein said latching means includes means for enabling release of said tongue-like extension from said second position into said first clamping position with positive tool guidance to prevent sparking during release of the clamp structure from said second position.

30. A self-tightening clamp structure according to claim 25, wherein said constriction means are coplanar with the respective area of the clamping band means.

* * * * *